Patented May 17, 1949

2,470,490

UNITED STATES PATENT OFFICE 2,470,490

PROCESS OF PURIFYING PTEROYLGLUTAMIC ACID AND RELATED COMPOUNDS

Brian L. Hutchings, Pearl River, N. Y., assignor to American Cyanamid Company, New York, N. Y., a corporation of Maine No Drawing. Application April 22, 1948,
Serial No. 22,720

8 Claims. (Cl. 260—251)

This invention relates to a process of purifying pteroylglutamic acid and related compounds. This application is a continuation-in-part of my application Serial Number 715,637, filed December 12, 1946.

Pteroylglutamic acid is a chemical reaction product having the more exact name N-[4-{-[(2-amino-4-hydroxy-6-pyrimido [4,5-b] pyrazyl) methyl] amino} benzoyl] glutamic acid. This product is a growth promoting material having vitamin like properties and appears to be analogous to or identical with naturally occurring folic acid. The product is now being manufactured and supplied to the medical profession in large quantities. It is used to stimulate hemoglobin formation and in the treatment of agranulocytosis, sprue, and other related diseases. Certain other related pterins have also been prepared and have been found useful in medicine for a variety of purposes. Among these may be mentioned N - [4 - { - [(2 - amino - 4 - hydroxy-6 - pyrimido [4,5 - b] pyrazyl)methyl amino} benzoyl] diglutamylglutamic acid (pteroyldiglutamylglutamic acid), N-[4-{-[(2-amino-4-hydroxy - 6 - pyrimido [4,5 - b] pyrazyl)methyl]-amino}benzoyl] aspartic acid (pteroylaspartic acid), N - [4 - { - [1 - (2,4-diamino - 6 - pyrimido [4,5 - b] pyrazyl) ethyl] amino} benzoyl] glutamic acid, N-[4-{-N-[(2-amino-4-hydroxy-6-pyrimido [4,5-b] pyrazyl methyl] N-methyl-amino} benzoyl] glutamic acid, N-[4-{-[1-(2-amino-4-hydroxy-6-pyrimido [4,5-b] pyrazyl) ethyl amino} benzoyl] glutamic acid, N-[4-{-[(2,4 - diamino - 6 - pyrimido [4,5 - b] pyrazyl) methyl] amino} benzoyl] glutamic acid (4-aminopteroylglutamic acid) and 4-N-[2-amino-4-hydroxy-6-pyrimido [4,5-b] pyrazyl) methyl-N-methylamino] benzoic acid (N-methylpteroic acid). These compounds are of the class called pterins and may be represented by the general formula

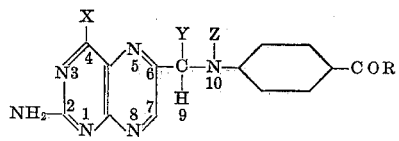

in which the radical —COR is a carboxy radical or an amide thereof such as —CONHR', in which R represents the radical of an amino acid. X is a radical of the group consisting of hydrogen, hydroxy and amino radicals and Y and Z are hydrogen or lower alkyl radicals.

Several methods of producing pteroylglutamic acid have been developed. For the most part these processes involve the simultaneous or stepwise reaction of 2,4,5 - triamino - 6 - hydroxy pyrimidine, p-aminobenzoylglutamic acid and an appropriate three carbon compound having reactive aldehyde and/or halogen groups such as alpha, beta-dibromopropionaldehyde, 2,2,3-trichloropropionaldehyde, 1,1,3 - tribromoacetone, reductone, mucohalic acids, and still others. Related products having vitamin or anti-vitamin like properties are prepared by analogous processes using p-aminobenzoic acid or amides thereof such as p - aminobenzoyldiglutamylglutamic acid, p-aminobenzoylaspartic acid, p-aminobenzoyl glycine and the like. Still other useful products having anti-vitamin like properties which correspond to the general formula above may be prepared by using in place of 2,4,5-triamino-6-hydroxypyrimidine, 4,5,6 - triaminopyrimidine, 2,4,5,6-tetraaminopyrimidine and other vicinal diaminopyrimidines.

Most of these products may also be prepared by reacting a 6-halopterin with p-aminobenzoic acid or an amide thereof.

Still other related compounds having anti-folic acid properties are prepared using in place of alpha,beta - dibromopropionaldehyde, 2,2,3 - trichlorobutanal or the like.

Pteroylglutamic acid has a highly complex molecule. Likewise the process by which it is formed is complex. As will be apparent from the nature of the different intermediates employed in its synthesis, numerous side reactions occur along with or following the principal reaction. Accordingly, the crude reaction product usually contains a relatively large number and proportion of undesired substances including unreacted intermediates, dark colored by-products, condensation and/or polymerization products such as 2-amino-4-hydroxy-6-methylpteridine and 2-amino - 4 - hydroxy - 7 - methylpteridine, position isomers such as the isomer of pteroylglutamic acid with the side chain in the 7-position on the pteridine ring, oxidation products such as 2-amino-4-hydroxypteridine-6-carboxylic acid, and various other products of hydrolysis and degradation such as 2-amino-4-hydroxy-6-formylpteridine. Most of these contain a pyrimidopyrazine nucleus and possess some of the same solubility and other physical and chemical characteristics of the desired pteroylglutamic acid. Apparentlty, products of this same type are formed in the crude reaction mixture when preparing the various pterins indicated by the general formula above. Inasmuch as the pteroylglutamic acid, pteroyldiglutamylglutamic acid, 4-aminopteroylglutamic acid and other such products are used as therapeutic agents, it is desirable that the biologically inactive pterins of the types mentioned above which are formed in the reaction mixtures be separated from the desired product.

Although several processes of separating pteroylglutamic acid and other compounds having the general structure shown above from related pterins which occur in the crude chemical reaction mixture have been developed, these methods are for the most part expensive or highly involved processes requiring exact manipulations in order to achieve even a reasonable recovery of the valuable pteroylglutamic acid. By the present process, however, I have made it possible to separate pteroylglutamic acid from related pterins with relative ease and with fairly good efficiency. This new process is easily adaptable to commercial plant production. As will be shown hereinafter in the specific examples, the process of the present invention is useful in separating products having the general formula above from the undesirable reaction products of the crude reaction mixture by which they are formed.

The new process of the present invention is dependent in a large measure upon the relative solubilities or insolubilities of the zinc salts of the various pterins which occur in the crude chemical reaction mixture. For example, in the presence of soluble zinc salts some of the undesirable pterins are relatively insoluble at a pH of 10.5 to 11.2, whereas the pteroylglutamic acids and the other pteroic acid derivatives of the general formula are moderately soluble at these hydrogen ion concentrations in the presence of the zinc salts. On the other hand, at pH levels of about 6.5 to 7.0 the zinc salts of these pteroic acid derivatives are relatively insoluble, whereas the by-product pterins are more water soluble at these pH levels. By taking careful advantage of these conditions, it is possible to make substantial progress in the purification of crude reaction mixtures containing pteroic acid and the related pterins of the general formula.

In its broader aspects my process involves preparation of the zinc salts of the various pterins having the general formula above, including pteroylglutamic acid, preferably by adding an acidic zinc salt to a solution of pterins in an alkali. This solution is adjusted to a hydrogen ion concentration of about pH 10.5 to pH 11.2, usually by adding the acidic zinc salt. After adjustment of the hydrogen ion concentration to within the range, the solution is filtered or centrifuged to remove the insoluble products which may be present, including reaction products of the zinc salt with certain undesirable pterins which may be present in the crude reaction mixture. This precipitation may take place either while the solution is hot or cold.

The pH of the solution is then reduced to within the range of about 6.5 to 7.0 with additional amounts of an acidic zinc salt or by the addition of acid. Under these conditions the zinc salts of the compounds having the general formula shown above have a minimum solubility and precipitate from solution. Other zinc salts and compounds remain in solution.

An additional peculiarity in the action of the zinc salts of the compounds having the general formula is that their solubility increases but slightly, if at all, with an increase in temperature. On the other hand, the solubility of other pterins in the solution tends to increase with a rise in temperature. It is preferred, therefore, but not necessary, that the precipitation of zinc pteroylglutamate and other zinc pteroyl derivatives take place at an elevated temperature, preferably from about 50° C. to 95° C.

While the precipitated zinc salts are of greatly increased purity, it is usually desirable to repeat the process until practically all of the impurities have been removed. To do this the zinc salt is dissolved in an aqueous solution of an alkali, sodium hydroxide, calcium hydroxide, barium hydroxide or the like, at a pH above about 11.5. The insoluble zinc hydroxide and other insoluble substances may then be removed by filtration, and the process just described repeated.

When it is considered that the purification has been carried far enough, treatment of the zinc salt with an acid to a pH below five, preferably at pH about 3, results in precipitation of the free pterin of the general formula. The product may be separated from its mother liquor and dried or made up into pharmaceutical products of various kinds.

Although the new process is particularly useful in the purification of pteroylglutamic acid, I have found that it is also useful in separating other related products such as pteroic acid, pteroyldiglutamylglutamic acid, amino acid amides of pteroic acids, and still other pterins from their crude chemical reaction mixtures.

The following is a general description of the process when purifying pteroylglutamic acid.

Crude pteroylglutamic acid containing a mixture of unidentified pterins and other products of the synthesis is treated in water at a temperature of between about 25° C. to 75° C. with two to three times, or more, by weight of the amount of pteroylglutamic acid in the crude mixture of calcium hydroxide or barium hydroxide at a concentration of from about 0.2 to 3.0 g. of real pteroylglutamic acid per liter. The pH of the solution should be from about 11.5 to 12.1 or slightly higher. The solution is then filtered to remove some of the insoluble impurities.

A solution of zinc chloride, zinc sulfate, zinc acetate, or other soluble acidic zinc salt, is then added to the filtrate to reduce the pH to within the range of about 10.5 to 11.2. The amount of zinc salt that is added should be carefully governed in that at a pH below about 10.5 much of the pteroylglutamic acid is lost, whereas at a pH in excess of 11.2 not enough of the impurities are removed.

The solution is then filtered to remove most of the insoluble pigments which are precipitated as a result of the zinc salt treatment. A clear yellow solution is obtained containing from 65 to 90% of the original pteroylglutamic acid.

The filtered solution is warmed to within the range 50° to 95° C. and is again treated with the zinc salt to lower the pH to within the range of about 6.5 to 7.0, from which solution the zinc salt of pteroylglutamic acid is precipitated.

The precipitated zinc salt is further purified, as may be necessary, by redissolving in water with sodium hydroxide, sodium carbonate, calcium hydroxide, barium hydroxide, or other alkali and again precipitating as the zinc salt by the process just described. Under some conditions as many as five or more zinc salt precipitations may be necessary to remove all of the impurities associated with the crude pteroylglutamic acid reaction product.

The final zinc salt is dissolved in calcium or barium hydroxide solution and clarified to remove insoluble zinc compounds. The zinc chloride solution is then added to reduce the pH to between 9.5 and 11.0 to remove last traces of the red pigments, after which the solution is then filtered and treated with an acid to precipitate pteroylglutamic acid in a degree of purity sufficient for most of its uses.

The following examples will illustrate in still greater detail the process of the present invention.

*Example 1*

Crude pteroylglutamic acid resulting from the reaction of 2,4,5-triamino-6-hydroxypyrimidine, alpha, beta - dibromopropionaldehyde and p-aminobenzoylglutamic acid is dissolved in water with lime at 60° C. at a concentration of 1 g. of real pteroylglutamic acid per liter at a pH between 11.5 and 12.1. The solution is then filtered to remove insoluble calcium salts of some of the impurities.

A 20% zinc chloride solution is added to the filtrate to reduce the pH to 10.6–10.8, and the solution is again filtered to obtain a clear yellow solution containing most of the original pteroylglutamic acid.

The solution of the zinc salt of pteroylglutamic acid is then treated with more of the zinc chloride solution at a temperature of 80° C. to reduce the pH to 6.8 at which the zinc salt precipitates from the solution.

The precipitated zinc salt is redissolved with lime in water, and the process just described is repeated five times. The final solution of the zinc salt at a pH of 10.6 to 10.8 is then treated with sulfuric acid to a pH of about 3 to precipitate pteroylglutamic acid of 85 to 90% purity.

*Example 2*

250 g. of crude pteroylglutamic acid containing approximately 25% of the real acid and the remainder pterins of unidentified composition and other products is dissolved in 275 pounds of water and 2.2 pounds of sodium hydroxide at about 30° C. Then 6.7 pounds of barium chloride as the dihydrate is added and 39 pounds of ethyl alcohol. The charge is stirred one hour, then filtered to give 325 pounds of filtrate. This solution contains about 60 g. of real pteroylglutamic acid and about 100 g. of the unidentified pterins.

One quarter of the above solution, at about 30° C., is diluted to 405 pounds with water and adjusted to a pH of 7.0 with hydrochloric acid. Then 3 pounds of Hyflo Supercel is added, and the charge is clarified.

The solution above is treated with ½ pound of zinc acetate and then adjusted to pH 6.8 with hydrochloric acid and/or sodium hydroxide, as necessary. One pound of Hyflo Supercel is added and the precipitate collected on the filter. The filtrate contains less than 5 gammas/ml. of pteroylglutamic acid and 17.6 g. of the pterins.

The precipitate from the above procedure is slurried in 400 pounds of water and 724 g. of flake caustic. The precipitated zinc hydroxide and Hyflo is removed by filtration. The filtrate is then adjusted to a pH of 7.0 with hydrochloric acid and ½ pound of zinc acetate is added. The solution is again readjusted to a pH of 6.8, and the precipitate collected on the filter.

The zinc pteroylglutamate thus obtained is dissolved in 60 pounds of water and 120 g. of sodium hydroxide. The solution is then treated with about 5 g. of activated charcoal and is filtered. The treatment with activated charcoal is then repeated.

The filtrate from the above treatment is adjusted to a pH of 3.0 with hydrochloric acid, heated to 80° C. to dissolve the precipitate, clarified while hot, and cooled to 40° C. The yellow precipitate obtained is relatively pure pteroylglutamic acid.

*Example 3*

Three grams of real pteroylglutamic acid as 100 grams of wet crude material is slurried in a little water to a smooth paste and then diluted to 2,000 cc. It is treated with 40 cc. of 5 normal sodium hydroxide solution, warmed to 50° C., and then diluted further to 3,400 cc.

To this solution is added with vigorous stirring 14 grams of calcium chloride in the form of a 15% aqueous solution to give no change in the pH 11.7. The dark precipitate is removed by filtration and washed on the filter with cold water.

The filtrate is then treated with a 10% aqueous zinc chloride solution to pH 10.8, 20 grams of filter aid (Hyflo Supercel) is added, and the dark precipitate is removed by filtration.

The light yellow colored filtrate is treated with a 10% aqueous solution of lead nitrate to pH 6.8. After the addition of 40 grams of filter aid the solution is heated to 80° C. and filtered hot.

The wet cake is slurried in 1 liter of water and treated with dilute sodium hydroxide to a faint pink spot on Benzoazurine test paper, then diluted to 3 liters and treated with lead nitrate solution to pH 7.5. It is then heated to 80° C. and the insolubles removed by filtration.

The procedure described in the preceding paragraph is applied three times more to the filter cake, until the neutral pterins in the filtrate are less than 15 gammas/ml.

After the last treatment the wet cake is slurried in 1.5 liters of 0.1 N sodium hydroxide solution and the insolubles removed by filtration. After the addition of 20 grams of filter aid the filtrate is adjusted to pH 3.2 with hydrochloric acid. The precipitate is collected on the filter, together with the filter aid. This cake is then treated with an excess of lime in 1,500 cc. water, and filtered. The filtrate is heated to 85° C. and acidified to pH 3 to 4 with acetic acid. The pteroylglutamic acid precipitates and after cooling is collected on the filter, washed with water and alcohol and dried. The yield is 1.4 grams of material of 86.5% purity.

*Example 4*

1,884 grams of a crude reaction product containing by chemical assay 12.9% of pteroylglutamylglutamic acid resulting from the reaction of 2,4,5-triamino-6-hydroxypyrimidine sulfate, dibromopropionaldehyde, and p-aminobenzoylglutamylglutamic acid was dissolved in 250 liters of 0.1 N sodium hydroxide at 60° C. 1,350 grams of calcium chloride dissolved in a small amount of water was added after adding 500 grams of diatomaceous earth filter aid. The resulting mixture was then filtered. To the 255 liters of filtrate containing 0.759 milligrams per milliliter of pteroylglutamylglutamic acid was added 2 kilograms of filter aid and a 20% solution of zinc chloride until the pH was 10.8–10.9. The temperature of the solution was maintained at 40° C. The suspension was filtered, and the filtrate consisting of 267 liters containing 0.570 milligrams per milliliter of pteroylglutamylglutamic acid was again treated with 2 kilograms of filter aid, and a solution of 20% zinc chloride was added until the pH was 6.8. The suspension was again filtered, and the filtrate discarded.

The filter cake was slurried in 35 liters of 0.1 N sodium hydroxide at 40° C. for 20 minutes. Concentrated hydrochloric acid was added to a pH of 2.4, and the solution cooled with ice to 10° C. The solution was then filtered, and the filter cake containing filter aid and pteroylglutamylglutamic acid was recovered.

The filter cake obtained from the above was slurried in 4.2 liters of water and 280 milliliters of 10 N sodium hydroxide at 50° C. and then filtered. The filter cake was washed twice by slurrying in 4.2 liters of water and 100 cc. of 10 N sodium hydroxide, followed by filtering. The filtrate was made up to 14 liters at 40° C. 980 milliliters of concentrated hydrochloric acid was added rapidly with stirring. The solution was then cooled to slightly below 0° C. for three hours, after which 700 grams of filter aid was added, after which the suspension was filtered and the filter cake washed with water.

The filter cake from the above was treated with 20 liters of water and 224 milliliters of 10 N sodium hydroxide at 60° C. 415 ml. of 30% calcium chloride solution was then added, and the solution filtered. To the filtrate at 40° C. was added 700 grams of filter aid and enough zinc chloride to make the pH of the solution 10.85. The suspension was filtered and the filtrate treated with enough concentrated hydrochloric acid to just redissolve the precipitate which first formed. The solution was then cooled to slightly below 0° C. for three hours, after which the resulting precipitate was recovered and washed twice by slurrying in 2 liters of water each time. When a small portion of the product was dried in vacuum at 100° C. and analyzed chemically, it was found to contain 95% pure pteroylglutamylglutamic acid.

*Example 5*

A crude reaction mixture containing pterins resulting from the reaction of 2,4,5-triamino-6-hydroxypyrimidine, tribromoacetone, and p-aminobenzoylglutamic acid and containing 55.5% of pteroylglutamic acid, the remainder being by-products of unidentified composition, is dissolved in 3,000 parts of 0.1 N sodium hydroxide solution to a concentration of 2,020 gammas of pteroylglutamic acid per milliliter, and the solution is heated to 60° C. for 10 minutes. To the above solution is slowly added 30 parts by weight of calcium chloride as a 30% aqueous solution. Then 25 parts filter aid is added, and the solution is filtered at 60° C. The filter cake is washed with warm water and discarded.

To the filtrate from the above having a volume of 4,230 milliliters and a temperature of 40° C. is slowly added 115 cc. of 10% zinc chloride solution to lower the pH to 10.6 to 10.8. 25 parts of filter aid is added, and the solution is filtered and the filter cake washed with 500 parts of warm water and discarded.

To the filtrate, having a volume of 4,960 parts, is added 65 parts of 10% zinc chloride solution to lower the pH to 6.7 to 6.9, and the temperature of the solution is raised to 75° C. 50 parts of filter aid is added, and the solid is filtered off at a temperature of 75° to 80° C. The filter cake is washed with 500 parts of warm water, and the filtrate is discarded. The filter cake containing the zinc salt of pteroylglutamic acid is slurried in 3,000 parts water and sodium hydroxide is added as a 20% solution until a faint spot on Benzoazurine test paper is obtained. The solution is clarified, the filter cake washed with 200 to 300 parts of water and discarded. To the filtrate is then added over a period of ½ hour 100 parts of glacial acetic acid and 200 parts of water at 70° to 75° C. The slurry is cooled to 10° C. and filtered. The cake is washed well with cold water and acetone and dried for three hours at 50° C. The deep orange yellow crystals of pteroylglutamic acid have been increased to a purity of 77.8%.

*Example 6*

To 400 parts water are added 20.6 parts 2,4,5-triamino-6-hydroxypyrimidine sulfate and 21 parts barium chloride dihydrate, and the slurry is heated to 60° C. for 20 minutes. A solution of 22.1 parts p-aminobenzoyl-gamma-glutamyl-gamma-glutamylglutamic acid in 440 parts water is added, and the pH is adjusted to 3.0 to 3.5 by the addition of 20% sodium hydroxide. After raising the temperature to 75° to 80° C., 40 parts tribromoacetone is added over a 5-minute period, along with enough 20% sodium hydroxide to maintain the pH between 3.0 and 3.5. The slurry is then heated for one hour at 75° to 80° C. During this time more acid is liberated, and the pH is maintained between 3.0 and 3.5 by the addition of 20% sodium hydroxide. The temperature is then lowered to 10° C., the dark red-brown solid filtered off, and washed with a small amount of ice water.

The crude pteroyl-gamma-glutamyl-gamma-glutamylglutamic acid obtained above may be purified by treating an alkaline solution of the crude material with a soluble zinc salt to a pH within the range 10.5 to 11.2, filtering, and thereafter reducing the pH to within the range 6.5 to 7.0, whereupon the insoluble zinc pteroyl-gamma-glutamyl-gamma-glutamylglutamate separates from solution.

A specific procedure is as follows: The crude pteroyl-gamma-glutamyl-gamma-glutamylglutamic acid containing 10.6 parts of the desired product and the impurities of the reaction is slurried in 10,000 parts of 0.1 N sodium hydroxide solution and the temperature raised to 60° C. To this solution is added 260 parts of 30% calcium chloride solution and 100 parts of filter aid, and the solution is clarified by filtration. The filtrate is cooled to 45° C. and sufficient 10% zinc chloride solution is added to lower the pH to 10.6 to 10.8. 100 parts of filter aid is added, and the solution is filtered.

The pH of the filtrate from the above is adjusted to 6.7 to 6.9 by the addition of a 10% solution of zinc chloride, and the temperature is raised to 70° C. 100 parts of filter aid is again added and the solution filtered. The filter cake which contains the desired pteroyl-gamma-glutamyl-gamma-glutamylglutamic acid as the zinc salt is slurried in 1,000 parts of water and enough lime so that the solution develops a strong spot on Benzoazurine test paper. The temperature is raised to 50° C., and the solution is clarified. The filtrate is then acidified to pH 2.5 with concentrated hydrochloric acid and the temperature lowered to 5° C. Filter aid is again added and the solution filtered. The filter cake contains pteroyl-gamma-glutamyl-gamma-glutamylglutamic acid separated from many of the impurities existing in the crude reaction mixture. The product may be further purified by repetition of the zinc salt precipitation as described above.

*Example 7*

30.8 parts of 2,4,5-triamino-6-hydroxypyrimidine sulfate, 29.3 parts of barium chloride dihydrate and 600 parts of water are heated to 60° C. for a few minutes, then cooled to 40° C. 13.3 parts of p-amino-benzoylglutamic acid is added, and the pH adjusted to 3. During 25 minutes 17.5 parts of butylchloral (2,2,3-trichlorobutanal) is added along with caustic to maintain a pH of 3. After an additional half hour of stirring, the mixture is cooled, filtered and dried. Yield 49.1 parts; chemical assay 18% real.

The crude product obtained above may be purified by the following procedure. Three parts (real) of the crude material is slurried with 6 parts of lime in 3,000 parts of water, heated to 60° C. and clarified. The filtrate is adjusted to pH 10.8 with aqueous zinc chloride and again clarified. A zinc salt is precipitated by the addition of zinc chloride to pH 6.8 at 80° C. and is filtered hot. The zinc salt cake is slurried with 3,000 parts of water with caustic to bring the pH to about 12. The slurry is again adjusted to pH 6.8 with zinc chloride and filtered. A third zinc salt is prepared in the same way. The cake is then slurried with 4.5 parts of lime and 700 parts of water at 90° C., clarified, acidified to pH 3, cooled and filtered. The cake is slurried with 6 parts of magnesium carbonate and 450 parts of water at 90° C. 1.5 parts of charcoal is added and the slurry clarified, acidified to pH 3, cooled and filtered. Yield 1.81 parts, chemical assay—79% real.

*Example 8*

A quantity of the crude reaction product of 2,4,5,6-tetraamino-pyrimidine sulfate, dibromopropionaldehyde and p-aminobenzoylglutamic acid containing 2 parts of N-(4-[2,4-diaminopyrimido [4,5-b] pyrazyl-6-methylamino] benzoyl) glutamic acid, also called 4-aminopteroylglutamic acid, is slurried with 4 parts of lime and 2,000 parts of water at 60°–70° C. for 15 minutes. Filter aid is added, and the mixture filtered. The filtrate is treated with filter aid and 20% zinc chloride solution to a pH of 10.6. The slurry is then clarified, and the filtrate heated to 80° C. Zinc chloride solution is added to pH 6.8, and the zinc salt is filtered with filter aid. The cake is slurried with 4 parts of lime and 1,000 parts of water at 90° C. and clarified. The filtrate is adjusted to pH 4 with dilute HCl, cooled and filtered with filter aid. This cake is slurried with 4 parts of magnesium carbonate and 700 parts of water at 85°–90° C., stirred with 1.5 parts of charcoal for 5 minutes and filtered. The filtrate is adjusted to pH 4, cooled and filtered. The product weighs 1.1 parts and assays 74.3% 4-aminopteroylglutamic acid, a considerable improvement in purity over that of the crude reaction mixture.

*Example 9*

A mixture of 25.7 grams 2,4,5-triamino-6-hydroxypyrimidine sulfate monohydrate, 24.4 grams barium chloride dihydrate, and 700 cc. water are heated to 60° C. for 10 minutes. After cooling to 40° C. 32.4 grams disodium-p-methylaminobenzoylglutamic acid is added and the mixture adjusted to pH 3–4. Simultaneously and at 40° C. solutions of 21.6 grams of 2,3-dibromopropionaldehyde in acetic acid, 12.5 grams iodine and 25 grams potassium iodide in 100 cc. water, and caustic to maintain pH 3–4 are added. The crude 4-[N-(2-amino-4-hydroxypyrimido [4,5-b] pyrazyl-6-methyl)-N-methylamino] benzylglutamic acid which is isolated has antagonist activity against pteroylglutamic acid.

One-half of the crude material prepared above is heated with 2 liters water and 9 grams lime to 60° C. for 40 minutes. After adding 25 grams filter aid, filtering, and washing, the filtrate is treated with 25 grams filter aid and a solution of 10% zinc chloride to pH 10.99 and filtered. The filtrate is heated to 80° C. and 20% zinc chloride solution added to pH 6.9. After filtering with 25 grams filter aid, the cake is treated with 3 liters water and caustic to pH 11–12 at 80° C. for 10 minutes. At 80° C. 20% zinc chloride solution is added to pH 6.9. The zinc salt is filtered off hot and reprecipitated 6 times more as described. The purity of the product is improved with each zinc precipitation.

*Example 10* p-Nitrobenzoyl-beta-alanine is prepared from p-nitrobenzoyl chloride and beta-alanine by the Schotten-Baumann reaction. It melts at 163.8°–165° C. The nitrobenzoyl-beta-alanine is reduced with zinc and acid to give p-aminobenzoyl-beta-alanine, melting point 151.8°–153.2° C. Pteroyl-beta-alanine is prepared by the reaction described by Waller, et al. (J. Am. Chem. Soc. 70, 19 (1948)) substituting p-aminobenzoyl-beta-alanine for p-aminobenzoylglutamic acid.

27.5 g. of crude pteroyl-beta-alanine, containing 3 grams real material by chemical assay, is slurried in 1750 cc. of water and 18 grams of lime, and heated to 80° C. for 40 minutes. The insolubles are removed by filtration. To the filtrate is added 10% zinc chloride solution to pH 10.8–11.0, and the insolubles are removed by clarification. The filtrate is heated to 80° C., and 20% zinc chloride solution is added to pH 6.75. The insoluble zinc salt is collected on the filter and washed with a little water.

The washed cake is then slurred in 3,000 cc. of water and dilute sodium hydroxide solution is added to pH 11.5–12.0. Then at 80° C. zinc chloride solution is added to reduce the pH to 6.9. The zinc salt is dissolved in alkali and precipitated by the addition of zinc chloride twice more as described above. The zinc salt is then dissolved in 800 cc. of water containing 6 g. of lime, clarified, the filtrate is treated with 10% zinc chloride to pH 10.8–11.0. The insolubles are removed by clarification, and the filtrate is added slowly to 100 cc. of hot 30% acetic acid. The yellow product which precipitates is collected on the filter, washed with water and acetone and dried. The recovery of pteroyl-beta-alanine is one gram, purity 78% by chemical assay.

*Example 11*

Crude N-methylpteroic acid (12.6 grams) is heated in 1,750 cc. water with 9 grams lime to 60° C. for 40 minutes and filtered with a filter aid; the cake is washed with 750 cc. water at 60° C. The filtrate (pH 12.11) is cooled to 40° C. and treated with a 10% zinc chloride solution to pH 10.85–11.0. After filtering off the precipitate, the filtrate is heated to 80° C. and treated with a 20% solution of zinc chloride to pH 6.99. The mixture is filtered at 80° C. and the filtrate discarded.

The cake is slurried in 2,500 cc. water and sodium hydroxide added to pH 11.0–11.6 and heated at 80° C. for 10 minutes. The pH is then adjusted to 7.09 with a 20% zinc chloride solution. After filtering at 80° C., the filtrate is sampled and tested for neutral pterins.

The above procedure is repeated four times to obtain a neutral pterin content of 4.5 gammas per ml. The pH's of the various zinc salt suspensions are 6.99, 6.94, 6.79 and 6.85.

The final zinc cake is slurried in 875 cc. water containing 1.5 grams lime and heated at 60° C. for 40 minutes. After filtering, the cake is washed with 375 cc. 60° C. water. The filtrate (pH 12.21) is cooled to 40° C. and adjusted to pH 9.82 with 20% zinc chloride solution. After filtering, the filtrate is added gradually to 100 cc. 30% acetic acid at 80° C. The crystalline $N^{10}$-methylpteroic acid which precipitated is filtered at 20° C., washed with water and alcohol, and dried.

I claim:

1. A process of separating zinc salts of compounds having the general formula

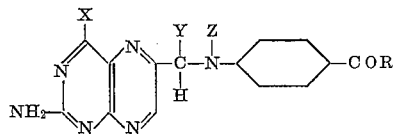

in which X is a member of the group consisting of hydrogen and —OH and —$NH_2$ radicals, Y and Z are members of the group consisting of hydrogen and lower alkyl radicals, and —COR an acidic radical of the group consisting of carboxy radicals and amino acid amides thereof from other pteridines which comprises the steps of preparing a solution of said compound and a soluble zinc salt at a pH within the range 10.5 to 11.2, removing insoluble matter, adjusting the pH to within the range 6.5 to 7.0 by the addition of an acidic zinc salt and recovering the insoluble zinc salt of the said compound which forms 2. A process of separating zinc salts of compounds having the general formula

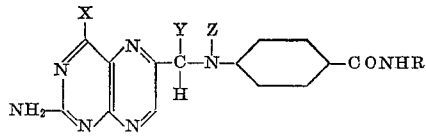

in which X is a member of the group consisting of hydrogen and —OH and —$NH_2$ radicals, Y and Z are members of the group consisting of hydrogen and lower alkyl radicals, and —NHR is the radical of an amino acid, from other pteridines associated therewith which comprises the steps of dissolving said compound in an alkaline solution at a pH in excess of about 11.5, adding an acidic zinc salt to the solution until the pH has been reduced to within the range 10.5 to 11.2, removing insoluble matter, adjusting the pH to within the range 6.5 to 7.0 in the presence of zinc salts, and recovering the insoluble zinc salt of the said compound which forms.

3. A process in accordance with claim 2 in which the insoluble zinc salt is redissolved in an alkaline solution, treated with a soluble zinc salt at a pH within the range 10.5 to 11.2, the solution clarified of insoluble matter and again adjusted to a pH within the range 6.5 to 7.0 in the presence of zinc salts, and the insoluble zinc salt again recovered.

4. A process of preparing zinc salts of pteroyldiglutamylglutamic acid which comprises the steps of dissolving crude pteroyldiglutamylglutamic acid in an alkaline solution at a pH above about 11.5, adding an acidic zinc salt to the alkaline solution until the pH has been reduced to within the range 10.5 to 11.2, removing insoluble matter, reducing the pH of the solution to within the range pH 6.5 to 7.0 in the presence of zinc salts, and thereafter separating from the solution the insoluble zinc pteroyldiglutamylglutamic acid which forms.

5. A process of preparing zinc salts of 4-aminopteroylglutamic acid which comprises the steps of dissolving crude 4-aminopteroylglutamic acid in an alkaline solution at a pH above about 11.5, adding an acidic zinc salt to the alkaline solution until the pH has been reduced to within the range 10.5 to 11.2, removing insoluble matter, reducing the pH of the solution to within the range pH 6.5 to 7.0 in the presence of zinc salts, and thereafter separating from the solution the insoluble zinc 4-aminopteroylglutamic acid which forms.

6. A process of improving the purity of compounds having the general formula

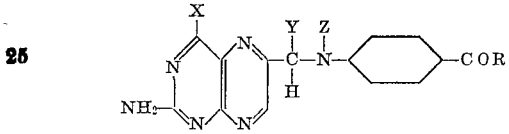

in which X is a member of the group consisting of hydrogen and —OH and —$NH_2$ radicals, Y and Z are members of the group consisting of hydrogen and lower alkyl radicals, and —COR an acidic radical of the group consisting of carboxy radicals and amino acid amides thereof, when contaminated with other pteridines which comprises the step of preparing an aqueous solution of the mixture, treating the solution with a soluble zinc salt at a pH within the range 10.5 to 11.2 and thereafter removing the insoluble matter from the solution of the said compound.

7. A method of obtaining zinc salts of compounds having the general formula

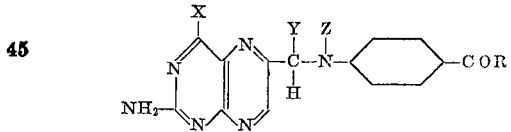

in which X is a member of the group consisting of hydrogen and —OH and —$NH_2$ radicals, Y and Z are members of the group consisting of hydrogen and lower alkyl radicals, and —COR an acidic radical of the group consisting of carboxy radicals and amino acid amides thereof, which comprises the step of treating an aqueous solution of said compound with a soluble zinc salt until the pH of the solution is within the range 6.5 to 7.0 and thereafter recovering the insoluble zinc salt of the said compound.

8. A process which comprises the steps of dissolving crude 4-[N-(2-amino-4-hydroxypyrimido[4,5 - b]pyrazyl - 6 - methyl) - N-methylamino]benzoylglutamic acid in an alkaline solution at a pH above 11.5, adding an acidic zinc salt to the alkaline solution until the pH has been reduced to within the range 10.5 to 11.2, removing insoluble material, reducing the pH of the solution to within the range 6.5 to 7.0 in the presence of zinc salts and thereafter separating from the solution the insoluble zinc 4-[N-(2-amino-4-hydroxypyrimido[4,5-b]pyrazyl - 6 - methyl) - N - methylamino]benzoylglutamate.

BRIAN L. HUTCHINGS.

No references cited.